United States Patent Office 2,708,639
Patented May 17, 1955

2,708,639

POLYMERS OF BUTADIENE-1,3, PROCESS OF MAKING THEM, AND COMPOSITIONS CONTAINING SAME

Henry C. Miller, Claymont, Del., assignor to E. I. du Pont de Nemours and Company, Wilmington, Del., a corporation of Delaware No Drawing. Application March 20, 1952, Serial No. 277,727

14 Claims. (Cl. 106—285)

The object of this invention is oily polymers of butadiene-1,3, the process of producing them, and compositions containing them.

Butadiene-1,3 has been polymerized with various catalysts, including boron trifluoride, to produce oily polymers. However, when these are air-dried or baked on steel or other surfaces, they yield hard inert coatings. Although some of these polymers can be used in coatings, they tend to be deficient in adhesion and toughness, and age poorly. In particular, these prior oily polymers have not been satisfactory for use as coatings for black sheet steel for wet-pack food and beverage containers.

It has now been found that the polymerization of butadiene-1,3 at —20° to +20° C., in the presence of boron trifluoride etherate containing from 0.1 to 1.4 moles of water per mole of boron trifluoride diethyl ether complex, will produce oily polybutadienes which have radically different flexibility and aging characteristics that make them suitable for coating compositions, including coatings for black sheet steel or tin plate for wet-pack food and beverage containers.

This invention accordingly provides new oily polymers of butadiene which yield baked films on steel that possess good adhesion, flexibility and aging characteristics.

In one method for preparing the oily polybutadienes of this invention, a reactor fitted with a stirrer, vent valve, and inlet tube to deliver butadiene as a gas is charged with an inert solvent, e. g., petroleum ether, and from 4 to 40 per cent, by volume of the solvent, of a boron trifluoride-diethyl ether complex containing from 0.1 to 1.4 moles of water per mole of the boron trifluoride etherate. The reactor is cooled to between —20° and +20° C., the butadiene and vent valves are opened, and the reactor is swept oxygen-free with butadiene. Thereafter, the vent valve is closed and the butadiene inlet regulated to maintain a positive pressure within the reactor. This pressure is maintained constant at the temperature selected for reaction by injecting butadiene as needed. After there is no further reaction, as evidenced by cessation of pressure drop, the reaction mixture is allowed to stand for from 1 to 10 hours, methanol is added to destroy the catalyst, and the mixture is then permitted to warm to room temperature. The contents of the reactor are drowned in methanol to destroy the catalyst, the methanol is then removed by decantation, and the residue is washed with water. The washed residue is dried over anhydrous magnesium sulfate, and the non-volatile product isolated by removal of the volatile materials by distillation.

In an alternative method for isolating the product, dry ammonia is added to the reaction product to precipitate the catalyst, and the precipitate is removed by filtration. The filtrate is a solution of the product in the reaction medium and it may be used as such or, if desired, subjected to distillation to remove the solvent.

The following examples are submitted to illustrate and not to limit this invention.

Example I

A pressure vessel, equipped with a stirrer, thermometer, vent valve, and inlet tube to deliver butadiene as a gas above the surface of the liquid in the reactor, is cooled in an efficient, thermostated bath designed to hold the reaction temperature at 0 to +5° C. The butadiene inlet tube is connected to a source of butadiene through a pressure regulator set to maintain a positive pressure of 10–20 mm. of mercury within the reactor. The reactor is charged with 100 volumes of petroleum ether and 25 volumes of a mixture of 18 volumes of boron trifluoride diethyl ether complex and 1 volume of water, which gives a molar composition of 1 mole $BF_3$/1 mole diethyl ether/0.4 mole of water. The mixture is stirred vigorously to disperse the catalyst mixture in the petroleum ether and the cooling bath is adjusted until the temperature inside the reactor is between 0 and +5° C. The butadiene pressure is then turned on and the vent valve is opened to allow the butadiene to displace the air. When this is accomplished the vent valve is closed. A vigorous exothermic reaction sets in and 1010 parts by weight of butadiene is absorbed in 4 hours. The addition of butadiene is then discontinued and the mixture is allowed to stir at 0 to +5° C. for an additional 2 hours. About 100 parts by volume of methanol is then added to the reactor to inactivate the catalyst and the reaction mixture is poured into 3000 parts by volume of methanol to precipitate the polymerized butadiene as a heavy oil. After being well mixed with the methanol, the methanol is decanted and a fresh portion of methanol added, to assist in the removal of the catalyst residue from the product. After washing once more with methanol and once with water, the oil is taken up in an additional quantity of petroleum ether, dried over magnesium sulfate, and filtered. The volatile materials are removed at 90° C. and 1–2 mm. pressure, leaving 748 parts of viscous polybutadiene. At 50% solids in benzene, the product is colorless and has a viscosity of A–3 on the Gardner-Holdt scale. A 1 to 2 mil film containing 0.03% cobalt, added as cobalt naphthenate, becomes tack-free at room temperature in 2.75 hours, and the film is still flexible after aging 4 months at room temperature. When baked 1 hour at 130° C., in the presence of 0.03% cobalt and 0.5% butyraldoxime, 1 to 2 mil films are hard and tack-free, have excellent gloss, and are still pliable after 18 hours aging in air at 130° C.

*Modification a.*—Example I is repeated, except that the temperature is 35 to 40° C. and the reaction time 3.5 hours, during which 125 parts of butadiene are injected. 72 parts of a light colored oil, having a viscosity of A–2 at 66% concentration in benzene, are obtained. A 1 to 2 mill film, containing 0.03% cobalt, air-dries to give coatings having initial properties similar to those of Example I, but which embrittle after aging at room temperature for 4 weeks.

*Modification b.*—Example I is repeated, using as the catalyst 15 parts of a $BF_3$. 1.37 $H_2O$, and operating at 20 to 25° C. During 3 hours of injection 360 parts of butadiene are added. At this temperature the polymerization is sluggish but, upon warming slightly, it becomes rapid and the temperature rises to 35° C., which temperature is maintained for 40 minutes. This yielded 261 parts of product which, at 50% concentration in benzene, has a viscosity of A–2 and a color of 1.0 on the Gardner-Holdt color meter scale. A 1 to 2 mil film containing 0.03% cobalt air-dries rapidly, but after 2 months aging at room temperature the film is brittle.

*Modification c.*—Example I is repeated, using 393 volumes of gaseous boron trifluoride as the catalyst and a reaction temperature of —40° C. During 2 hours reaction time 100 parts of butadiene are added. The product is curd-like and insoluble.

*Modification d.*—Example I is repeated at −34° to −26° C., using as the catalyst a boron trifluoride isopropyl alcohol complex corresponding to BF₃.0.8 isopropyl alcohol, and made by dissolving 14 parts of boron trifluoride in 10 parts of isopropyl alcohol. 60 parts of butadiene are added during a reaction time of 1 hour and 40 minutes. The bulk of the butadiene polymerizes to a solid, insoluble crust on the walls of the reactor and only a trace of soluble oil is isolated.

*Modification e.*—Attempts to polymerize butadiene using freshly distilled BF₃ etherate containing no water were unsuccessful, no polymer being obtained during 6 hours at 0° C. from 60 parts of monomer.

*Modification f.*—Similarly, anhydrous BF₃ etherate, to which has been added less than about 0.1 mole or more than about 1.4 moles of water, is inactive toward the polymerization of butadiene at −20° to 20° C.

*Modification g.*—A mixture of 10 parts of boron trifluoride-diethyl ether complex and 10 parts of boron trifluoride-monohydrate, at −28° to −37.5° C., yields a yellow oil of viscosity A–5 and a color of 1.0 on the Gardner-Holdt color meter scale. Films containing 0.03% cobalt and 0.5 butyraldoxime become brittle after baking for only 15 minutes at 130° C., and air-dried films containing 0.03% cobalt are brittle after aging 1 month at room temperature.

*Example II*

Example I is repeated, maintaining the reaction temperature between the limits of −19 and −16.5° C. 330 parts of butadiene are used over the course of 5 hours. After stirring at −23° C. for an additional 2 hours, the product is isolated as in Example I, yielding 93 parts of colorless oil having a viscosity of B at 50% in benzene, V at 72% benzene and Z–3 at 82% in benzene. Properties of air-dried films containing 0.03% cobalt and of baked compositions containing 0.03% cobalt and 0.5% butyraldoxime are similar to those of the polymer of Example I.

*Example III*

Example I is repeated, using 500 parts of a low boiling petroleum hydrocarbon as a polymerization medium and 20 parts of the same catalyst mixture. The polymerization temperature is maintained at +10° C. 400 parts of butadiene are consumed in 4 hours. There is obtained 105 parts of nearly colorless oil having a viscosity of A–3 at 50% solids in xylene. Its film properties are similar to those of the product of Example I.

A liquid polymerization medium is generally used to aid in dispersing the catalyst and in controlling the reaction temperature by dissipating the heat of reaction. Suitable media are the petroleum hydrocarbons, such as petroleum ether, cyclohexane or isooctane.

The reaction temperature is a critical factor in obtaining the products of this invention. At temperatures below −20° the reaction is too slow for practical purposes, and at temperatures above +20° C. the products do not have the desired flexibility and aging characteristics. The temperature range which combines good reaction rate with product quality is from −10° C. to +10° C., and this is therefore the preferred operating range.

The nature of the catalyst is another critical factor in obtaining the products of this invention. A series of small scale experiments was first performed in order to determine the effect of different ratios of water to boron trifluoride etherate. In these tests the moles of boron trifluoride etherate were kept constant and the moles of water were varied from 0.05 to 1.6 and the temperature of the reaction mixture noted. It was found that when less than 0.1 or more than 1.4 moles of water per mole of the etherate was used there was little or no temperature rise, indicating that substantially no polymerizaion of the butadiene had occurred. It was, therefore, concluded that the ratio of from 0.1 to 1.4 moles of water per mole of the etherate was critical for polymerization of the butadiene to take place.

As clearly illustrated in Modification *f* of Example I, butadiene is not polymerized if the mole ratio of water to boron trifluoride-diethyl ether complex is less than 0.1:1 or greater than 1.4:1. Moreover, as shown in Modifications *b, c, d*, and *g* other BF₃ derivatives, or even mixtures of BF₃ etherate with BF₃ hydrate, give products which are insoluble or deficient in flexibility and aging characteristics. As shown in Modification *e*, no polymer was obtained when no water was present. Therefore, in the practice of this invention, the catalyst used is a boron trifluoride-diethyl ether complex containing from 0.1 to 1.4 moles of water per mole of the etherate.

The diethyl ether-boron trifluoride complex used in making the hydrates used as catalysts in preparing the oils of this invention is a known compound, its properties being described on page 69 in the text by H. S. Booth and D. R. Martin entitled "Boron Trifluoride and Its Derivatives," John Wiley & Sons, Inc., New York (1949).

The amount of catalyst controls the time of reaction. As a rule, the amount of catalyst used varies between 4 and 40% by volume of the reaction medium.

The time of reaction is also dependent upon the catalyst concentration. Usually the reaction is permitted to run until there is cessation of pressure drop, for all practical purposes. The rate at which the pressure drops is a function of the temperature. Usually, the lower the temperature the slower the rate of pressure drop and the longer the time of reaction. In practice, temperature and catalyst concentrations are so adjusted as to obtain the desired product at a practical rate of reaction.

As a rule, the process is operated under autogenous pressure, although it can be operated under externally applied pressures.

The butadiene used should be of as high a degree of purity as possible. However, small amounts of other olefin hydrocarbons may be present in the butadiene without adversely affecting the quality of the product obtained, and in some cases copolymerization with a small percentage of other olefin hydrocarbons, such as styrene, decene-1, isobutylene, methyl pentadiene or 2-methyl-butadiene-1,3, may be desirable.

The polymers of this invention are unsaturated oils which undergo surface drying and skinning when in contact with oxygen. To retard this surface drying effect, it is desirable, especially for curing thick films, to add an antiskinning agent to the oil. A particularly useful one is butyraldoxime. These oils can be used as such or blended with modifiers, such as gums, resins, or plasticizers, for use as protective coatings for wood, textile, and metal surfaces, e. g., copper, aluminum, zinc and brass. They are especially useful as finishes for black sheet steel or tin plate employed in the fabrication of containers.

These oils or compositions containing them may be applied to the metal substrate by any of the known methods, such as dipping, brushing, spraying or rollercoating. If desired, an antiskinning agent, such as butyraldoxime, a varnish drier, such as a metal salt of a fatty acid or rosin acid in amount of from 0.005 to 0.1%, by weight, and pigments may be incorporated. The combination of antioxidant and drier functions to regulate the rate of film set up, and in that way they cooperate in producing films having good properties.

Although the oils of this invention air-dry, best results are obtained by baking them. The time of baking depends upon the temperature employed and the film thickness. For 0.1 to 0.2 mil films 12 minutes at 210° C. is adequate to produce insoluble, tough, flexible coatings which retain their flexibility after aging at room temperature for 2 months. The application of such coatings to food containers is illustrated below.

A 35% solids solution of the polybutadiene oil of Example I in an aliphatic hydrocarbon solvent was applied to black sheet metal at a coating rate of about 15 to 20 mgs. of dry film per 4 square inches, and the coating then baked for 12 minutes at 205° to 215° C. The baked film was flexible and resistant to synthetic meat fluid, beverage concentrates, corn and pumpkin, and therefore useful as an interior finish for containers destined for the packaging of these products.

Improved initial film properties are realized by incorporating maleic anhydride or other polymerizable modifiers, $SO_2$, natural drying oils, etc., into the polybutadiene oils of this invention. A preferred modifying agent is maleic anhydride, which may be used in amounts ranging from 1–10% by weight of the polybutadiene.

The preparation of a maleic anhydride modified composition is illustrated below:

| | |
|---|---|
| 50% solution of the polybutadiene of Example I in an aliphatic hydrocarbon solvent | 426.00 |
| Maleic anhydride | 16.00 |
| Di(tertiary-butyl)peroxide | 2.13 |
| Total | 444.13 |

The polybutadiene oil and the maleic anhydride were placed in a glass reactor equipped with a reflux condenser and an agitator, and the mixture heated to, and kept at, 135° C. while the catalyst was added slowly, with agitation. After the catalyst was added the reaction mixture was held at 135° C. for 1 hour, at which time the viscosity corresponded to K on the Gardner-Holdt scale. The reaction mixture was allowed to cool to room temperature and applied, as previously described, to black sheet metal. The coating was heated at 205° to 215° C. for 12 minutes. The resulting coating had excellent initial properties of smoothness and flexibility, and exposure to corn or pumpkin under canning conditions, or to synthetic meat fluid or synthetic beverage concentrates, had no effect on the coating.

The oils of this invention may be bodied by the use of heat, with or without the aid of catalysts and other agents. Bodying in the presence of air or oxygen may be desirable in some cases.

It will, therefore, be apparent that I have developed new and improved polymers of butadiene-1,3 which are oily and yield flexible dried films which retain their flexibility on standing for 4 months at room temperature, or after baking for 18 hours at 130° C., and a process of producing these oily polymers. It will also be apparent that these polymers produce new and useful coating compositions, either alone or when mixed with gums, resins, plasticizers and other materials.

It is apparent that many widely different embodiments of this invention may be made without departing from the spirit and scope thereof; and, therefore, it is not intended to be limited except as indicated in the appended claims.

I claim:

1. An oily homopolymer of butadiene-1,3 that yields films which are flexible after baking for 18 hours at 130° C.

2. A coating composition comprising, as the essential vehicle thereof, an oily homopolymer of butadiene-1,3 that yields films which are flexible after baking for 18 hours at 130° C. and an aliphatic hydrocarbon solvent.

3. A coating composition which, in 1 to 2 mil films, remains flexible after aging 4 months at room temperature, which comprises, as the essential vehicle thereof, an oily homopolymer of butadiene-1,3 and an aliphatic hydrocarbon solvent.

4. A coating composition which, in 1 to 2 mil films, remains flexible after aging 4 months at room temperature, which comprises an oily homopolymer of butadiene-1,3, inert solvent, and drier.

5. The process of producing oily polymers of butadiene-1,3 that yield flexible dried films, which comprises polymerizing butadiene-1,3 at from −20° to +20° C. in the presence of boron trifluoride etherate containing from 0.1 to 1.4 moles of water per mole of boron trifluoride diethyl ether complex.

6. The process of producing oily polymers of butadiene-1,3 that yield flexible dried films, which comprises polymerizing butadiene-1,3 at from −10° to +10° C. in the presence of boron trifluoride etherate containing from 0.1 to 1.4 moles of water per mole of boron trifluoride diethyl ether complex.

7. The process of producing oily polymers of butadiene-1,3 that yield flexible dried films, which comprises charging butadiene-1,3 gas into a reactor containing an inert solvent and a boron trifluoride diethyl ether complex containing from 0.1 to 1.4 moles of water per mole of boron trifluoride etherate, the latter being present in from 4 to 40%, by volume, of the inert solvent, cooling the reactor to between −20° and +20° C., regulating the butadiene input to maintain a constant pressure within the reactor until there is no further pressure drop even when further butadiene-1,3 is not added, allowing to stand, stopping the action of the catalyst, and washing the residue with water.

8. The process of producing oily polymers of butadiene-1,3 that yield flexible dried films, which comprises charging butadiene-1,3 gas into a reactor containing an inert solvent and a boron trifluoride diethyl ether complex containing from 0.1 to 1.4 moles of water per mole of boron trifluoride etherate, the latter being present in from 4 to 40%, by volume, of the inert solvent, cooling the reactor to between −20° and +20° C., regulating the butadiene input to maintain a constant pressure within the reactor until there is no further pressure drop even when further butadiene-1,3 is not added, allowing to stand, adding methanol to destroy the catalyst, and washing the residue with water.

9. The process of producing oily polymers of butadiene-1,3 that yield flexible dried films, which comprises charging butadiene-1,3 gas into a reactor containing an inert solvent and a boron trifluoride diethyl ether complex containing from 0.1 to 1.4 moles of water per mole of boron trifluoride etherate, the latter being present in from 4 to 40%, by volume, of the inert solvent, cooling the reactor to between −20° and +20° C., regulating the butadiene input to maintain a constant pressure within the reactor until there is no further pressure drop even when further butadiene-1,3 is not added, allowing to stand, precipitating with ammonia and filtering out the precipitate, and washing the residue with water.

10. The process of producing oily polymers of butadiene-1,3 that yield flexible dried films, which comprises charging butadiene-1,3 gas into a reactor containing an inert solvent and a boron trifluoride diethyl ether complex containing from 0.1 to 1.4 moles of water per mole of boron trifluoride etherate, the latter being present in from 4 to 40%, by volume, of the inert solvent, cooling the reactor to between −20° and +20° C., regulating the butadiene input to maintain a constant pressure within the reactor until there is no further pressure drop even when further butadiene-1,3 is not added, allowing to stand, stopping the action of the catalyst, washing the residue with water, drying, and removing the volatile material by distillation.

11. The process of producing oily polymers of butadiene-1,3 that yield flexible dried films, which comprises charging butadiene-1,3 gas into a reactor containing an inert solvent and a boron trifluoride diethyl ether complex containing from 0.1 to 1.4 moles of water per mole of boron trifluoride etherate, the latter being present in from 4 to 40%, by volume, of the inert solvent, cooling the reactor to between −20° and +20° C., regulating the butadiene input to maintain a constant pressure within the reactor until there is no further pressure drop even when further butadiene-1,3 is not added, allowing to stand, adding methanol to destroy the catalyst, washing the residue with water, drying, and removing the volatile material by distillation.

12. The process of producing oily polymers of butadiene-1,3 that yield flexible dried films, which comprises charging butadiene-1,3 gas into a reactor containing an inert solvent and a boron trifluoride diethyl ether complex containing from 0.1 to 1.4 moles of water per mole of boron trifluoride etherate, the latter being present in from 4 to 40%, by volume, of the inert solvent, cooling the reactor to between −20° and +20° C., regulating the butadiene input to maintain a constant pressure within the reactor until there is no further pressure drop even when further butadiene-1,3 is not added, allowing to stand, precipitating with ammonia and filtering out the precipitate, washing the residue with water, drying, and removing the volatile material by distillation.

13. The process of producing oily polymers of butadiene-1,3 that yield flexible dried films, which comprises charging butadiene-1,3 gas into a reactor containing an inert solvent and a boron trifluoride diethyl ether complex containing from 0.1 to 1.4 moles of water per mole of boron trifluoride etherate, the latter being present in from 4 to 40%, by volume, of the inert solvent, cooling the reactor to between −10° and +10° C., regulating the butadiene input to maintain a constant pressure drop even when further butadiene-1,3 is not added, allowing to stand, adding methanol to destroy the catalyst, and washing the residue with water.

14. The process of producing oily polymers of butadiene-1,3 that yield flexible dried films, which comprises charging butadiene-1,3 gas into a reactor containing an inert solvent and a boron trifluoride diethyl ether complex containing from 0.1 to 1.4 moles of water per mole of boron trifluoride etherate, the latter being present in from 4 to 40%, by volume, of the inert solvent, cooling the reactor to between −10° and +10° C., regulating the butadiene input to maintain a constant pressure drop even when further butadiene-1,3 is not added, allowing to stand, adding methanol to destroy the catalyst, washing the residue with water, drying, and removing the volatile material by distillation.

References Cited in the file of this patent

UNITED STATES PATENTS

| | | |
|---|---|---|
| 2,151,382 | Harmon | Mar. 21, 1939 |
| 2,460,973 | Calfee et al. | Feb. 8, 1949 |
| 2,569,383 | Leyonmark et al. | Sept. 25, 1951 |

FOREIGN PATENTS

| | | |
|---|---|---|
| 801,883 | France | May 30, 1936 |